(12) United States Patent
Wang

(10) Patent No.: US 7,053,590 B2
(45) Date of Patent: May 30, 2006

(54) POWER GENERATING SYSTEM INCLUDING A HIGH-FREQUENCY ALTERNATOR, A RECTIFIER MODULE, AND AN AUXILIARY POWER SUPPLY

(75) Inventor: Quincy Q. Wang, West Palm Beach, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 140 days.

(21) Appl. No.: 10/924,407

(22) Filed: Aug. 24, 2004

(65) Prior Publication Data

US 2006/0043940 A1    Mar. 2, 2006

(51) Int. Cl.
*H02P 9/00* (2006.01)
*H02P 9/44* (2006.01)

(52) U.S. Cl. .......................................... 322/24; 322/37

(58) Field of Classification Search ................ 322/11, 322/22, 24, 37, 45; 363/36, 32
See application file for complete search history.

(56) References Cited

U.S. PATENT DOCUMENTS

| | | | | |
|---|---|---|---|---|
| 4,403,292 A | * | 9/1983 | Ejzak et al. | 700/297 |
| 4,786,852 A | * | 11/1988 | Cook | 322/10 |
| 4,992,920 A | * | 2/1991 | Davis | 363/36 |
| 5,406,190 A | * | 4/1995 | Rosenberg | 322/32 |
| 6,815,934 B1 | * | 11/2004 | Colley | 322/47 |
| 2003/0222459 A1 | * | 12/2003 | Harris et al. | 290/28 |

* cited by examiner

*Primary Examiner*—Nicholas Ponomarenko
(74) *Attorney, Agent, or Firm*—Norman Friedland

(57) ABSTRACT

A power generating system includes a high-frequency alternator, a rectifier, a capacitor in each phase line extending between an output terminal of the alternator and the rectifier, and an auxiliary power supply, providing auxiliary power for use within the power generating system, which is also connected to the output terminals of the alternator.

7 Claims, 4 Drawing Sheets

| FIRST UNIT, VOLTAGE MODE | | | | CONNECTED TO AUX. TRANSFORMER | | |
|---|---|---|---|---|---|---|
| POWER AMPS | PHASE 2 | PHASE 1 | PHASE 3 | PHASE 4 | PHASE 5 | PHASE 6 |
| 0 | 1.5 | | | 3.5 | | 3.5 |
| 21 | 11.2 | | | 16.3 | | 16.3 |
| 41 | 21.0 | | | 29.0 | | 29.0 |
| 61 | 30.0 | | | 42.0 | | 42.0 |
| 80 | 38.0 | | | 58.0 | | 58.0 |
| 90 | 40.0 | | | 67.0 | | 67.0 |

*FIG. 2*

| SECOND UNIT, VOLTAGE MODE | | | | CONNECTED TO AUX. TRANSFORMER | | |
|---|---|---|---|---|---|---|
| POWER AMPS | PHASE 2 | PHASE 1 | PHASE 3 | PHASE 4 | PHASE 5 | PHASE 6 |
| 0 | 1.5 | 1.5 | 1.4 | 3.1 | 3.0 | 2.9 |
| 20 | 11.6 | 11.7 | 11.5 | 16.0 | 16.0 | 16.0 |
| 40 | 22.0 | 21.9 | 21.9 | 28.7 | 28.5 | 28.7 |
| 60 | 30.9 | 30.8 | 30.5 | 40.8 | 40.4 | 40.8 |
| 80 | 38.3 | 38.1 | 37.8 | 58.5 | 56.0 | 56.6 |

*FIG. 3*

| THIRD UNIT, CURRENT MODE | | | | CONNECTED TO AUX. TRANSFORMER | | |
|---|---|---|---|---|---|---|
| POWER AMPS | PHASE 2 | PHASE 1 | PHASE 3 | PHASE 4 | PHASE 5 | PHASE 6 |
| 14 | 8.4 | 8.4 | 8.3 | 11.7 | 11.7 | 11.6 |
| 23 | 13.4 | 13.4 | 13.3 | 17.3 | 17.3 | 17.4 |
| 38 | 20.6 | 21.0 | 20.7 | 25.8 | 25.9 | 26.1 |
| 59 | 30.8 | 31.0 | 30.8 | 39.5 | 39.3 | 39.5 |
| 74 | 37.5 | 37.7 | 37.4 | 51.0 | 50.7 | 51.2 |

*FIG. 4*

| FIRST UNIT, VOLTAGE MODE | | | | CONNECTED TO AUX. TRANSFORMER | | |
|---|---|---|---|---|---|---|
| POWER AMPS | PHASE 5 | PHASE 6 | PHASE 4 | PHASE 3 | PHASE 2 | PHASE 1 |
| 0 | 1.7 | | | 3.3 | | 3.3 |
| 20 | 11.8 | | | 15.9 | | 16.0 |
| 41 | 22.0 | | | 28.3 | | 28.5 |
| 60 | 30.6 | | | 40.4 | | 40.7 |
| 80 | 37.8 | | | 56.5 | | 56.7 |
| 90 | 40.6 | | | 65.2 | | 65.4 |

*FIG. 5*

| FIRST UNIT, VOLTAGE MODE | | | | CONNECTED TO AUX. TRANSFORMER | | |
|---|---|---|---|---|---|---|
| POWER AMPS | PHASE 5 | PHASE 6 | PHASE 4 | PHASE 3 | PHASE 2 | PHASE 1 |
| 0 | 2.0 | 2.0 | 1.9 | 2.7 | 2.7 | 2.6 |
| 20 | 13.5 | 13.4 | 13.3 | 13.9 | 13.6 | 13.8 |
| 40 | 25.5 | 25.4 | 25.2 | 25.8 | 25.7 | 25.7 |
| 60 | 37.1 | 37.1 | 37.0 | 37.0 | 36.9 | 37.0 |
| 80 | 50.9 | 51.0 | 50.3 | 50.7 | 50.7 | 50.8 |

FIG. 6

| FIRST UNIT, VOLTAGE MODE | | | | CONNECTED TO AUX. TRANSFORMER | | |
|---|---|---|---|---|---|---|
| POWER AMPS | PHASE 5 | PHASE 6 | PHASE 4 | PHASE 3 | PHASE 2 | PHASE 1 |
| 13 | 9.6 | 9.5 | 9.4 | 10.5 | 10.1 | 10.3 |
| 27 | 17.0 | 16.9 | 16.7 | 17.5 | 17.3 | 17.7 |
| 43 | 25.9 | 25.9 | 25.6 | 26.4 | 26.1 | 26.5 |
| 59 | 34.9 | 34.9 | 34.0 | 35.1 | 34.2 | 35.0 |
| 69 | 40.6 | 40.6 | 40.3 | 41.7 | 40.8 | 41.7 |
| 80 | 47.1 | 47.7 | 46.9 | 47.9 | 46.6 | 47.9 |

FIG. 7

| THIRD UNIT, CURRENT MODE | | | | CONNECTED TO AUX. TRANSFORMER | | |
|---|---|---|---|---|---|---|
| POWER AMPS | PHASE 2 | PHASE 1 | PHASE 3 | PHASE 4 | PHASE 5 | PHASE 6 |
| 15 | 10.1 | 10.2 | 10.3 | 11.2 | 11.2 | 11.2 |
| 40 | 24.3 | 24.4 | 24.3 | 24.8 | 24.9 | 24.6 |
| 60 | 35.2 | 36.3 | 35.3 | 35.8 | 36.1 | 35.9 |
| 69 | 40.5 | 40.7 | 40.8 | 41.3 | 41.9 | 41.8 |

FIG. 8

POWER GENERATING SYSTEM INCLUDING A HIGH-FREQUENCY ALTERNATOR, A RECTIFIER MODULE, AND AN AUXILIARY POWER SUPPLY

BACKGROUND OF THE INVENTION

1. Field of the Invention

This invention relates to an electrical power generating system including an alternator producing polyphase alternating current at a high frequency, and, more particularly, to a rectifier and an auxiliary alternating current power supply within such a power generating system.

2. Summary of the Background Art

A number of electrical generating systems employ a polyphase alternator driven at a high speed by a relatively small gas turbine, called microturbine, to produce polyphase alternating current at a high frequency, such as 2.3 kHz. This high-frequency alternating current is then rectified, producing direct current that can be used for other purposes, such as generating 50- or 60-Hz alternating current. Individual generating systems of this kind are used to produce a few kilowatts to a few megawatts of electrical power. An alternator of this type generates electricity through the use of magnetic fields established with permanent magnets.

One problem that has been identified with this type of generating system arises from the substantial internal inductive reactance of the alternator, which causes the output voltage of the alternator at its rated load to be significantly lower than its unloaded output voltage. As described in detail in U.S. Pat. App. Pub. No. 2003/0222459 A1, the disclosure of which is hereby included by reference, such an alternator may be a rotating drum-type machine having an annular air-gap, across which radial magnetic flux is established by a heteropolar permanent-magnet rotor. The inductive reactance of such an alternator is further described as restricting the available output power from the alternator by reducing the rated terminal voltage at rated current and by imposing a limit on the permissible current. The reduction in the rated terminal voltage at the rated current, which reduces both power output and efficiency, is present in any machine that includes significant internal inductive reactance. The limit imposed on the permissible current, which is accepted to restrict the internal reactance to an acceptable level, comes into play in an alternator design in which the rated current is limited by the need to hold the reactive voltage drop between an unloaded operating condition and operation at the rated load to an acceptable level, instead of by a need to limit heating within the alternator.

U.S. Pat. App. Pub. No. 2003/0222459 A1 further describes a polyphase alternator of this kind having a capacitor connected in series with each of the output terminals of a polyphase alternator of this kind, with the value of the capacitance of each capacitor being selected so that a drop in voltage from no-load to full-load occurring at the output terminal of the alternator is essentially offset at an output terminal at each of the capacitors.

This arrangement has been conventionally used to provide auxiliary power through the attachment of a transformer to the outputs of the capacitors, which are in turn attached to the output terminals of the alternator, along with the attachment of a rectifier to the outputs of the capacitors to provide output power. However, the addition of an inductive load, such as the windings of a polyphase transformer to provide power for auxiliary functions needed to run the microturbine, to the output terminals of such capacitors wired in series with a polyphase alternator has proven to increase the current flowing through the capacitors and out windings of the alternator in a way that places an undesirable limitation on the power that can be produced by the alternator. What is needed is a way to achieve the advantages of adding capacitance to the output lines of a high-frequency polyphase alternator when the output power from the alternator is used both to produce rectified direct current and to produce auxiliary power for use within the microturbine through a polyphase transformer, without significantly limiting the power that can be produced due to increased current associated with the reactance of the transformer windings.

SUMMARY OF THE INVENTION

It is therefore an objective of the invention to provide a power generating system including a high-frequency alternator in which capacitors are retained within output lines to maintain a small difference between unloaded operation and operation at a rated power.

It is another objective of the invention to provide such a power generating system including an auxiliary power supply using alternating current generated by the alternator without substantially degrading the output power that can be generated.

It is yet another objective of the invention to provide a convenient modular device for attachment to a high-frequency polyphase alternator to rectify output current produced by the alternator and to provide capacitance needed for voltage regulation.

In accordance with one aspect of the invention, a system is provided for generating direct current and for generating auxiliary power for use within the system. The system includes an alternator, a number of capacitors, a rectifier, and an auxiliary power supply. The alternator has a number of alternator output terminals. Each of the capacitors includes an input side and an output side, with the input side being connected to one of the alternator output terminals. The rectifier includes a number of input points, with each of the input points being connected to the output side of one of the capacitors. The auxiliary power supply is connected to two or more of the alternator output terminals.

The auxiliary power supply preferably includes a transformer having primary windings connected to the alternator output terminals. For example, the alternator, which produces alternating current having a frequency exceeding one kHz, includes six alternator output terminals providing alternating current at six phases, with three of the alternator output terminals being connected to the primary winding of the transformer to provide alternating current at three phases.

In accordance with another aspect of the invention, a rectifier module is provided for producing direct current from the outputs of an alternator and for controlling voltage regulation within a power generating system. The rectifier module includes a housing, a number of input terminals for connection to the outputs of the alternator, a number of capacitors, a rectifier, and positive and negative output terminals. Each of the capacitors includes an input side, connected to one of the input terminals, and an output side. The rectifier includes a number of input points, each of which is connected to the output side of one of the capacitors. While the housing provides an advantage of modular construction, it need not surround the capacitors and rectifier.

BRIEF DESCRIPTION OF THE DRAWING

FIG. 2 is a table showing current values measured during operation of a first example of a power generating system in a voltage mode with a conventionally connected auxiliary power supply, as shown by dashed lines in FIG. 1;

FIG. 3 is a table showing current values measured during operation of a second example of a power generating system in the voltage mode with the conventionally connected auxiliary power supply;

FIG. 4 is a table showing current values measured during operation of a third example of a power generating system in a current mode with the conventionally connected auxiliary power supply;

FIG. 5 is a table showing current values measured during operation of the first example of a power generating system in the voltage mode with an auxiliary power supply conventionally connected to different phase lines;

FIG. 6 is a table showing current values measured during operation of the first example of a power generating system in the voltage mode with the capacitance eliminated;

FIG. 7 is a table showing current values measured during operation of the first example of a power generating system in the voltage mode with the auxiliary power supply connected in accordance with the invention, as shown by solid lines in FIG. 1; and FIG. 8 is a table showing current values measured during operation of the third example of a power generating system in the current mode with the auxiliary power supply connected in accordance with the invention.

DETAILED DESCRIPTION OF THE INVENTION

Figure 1:
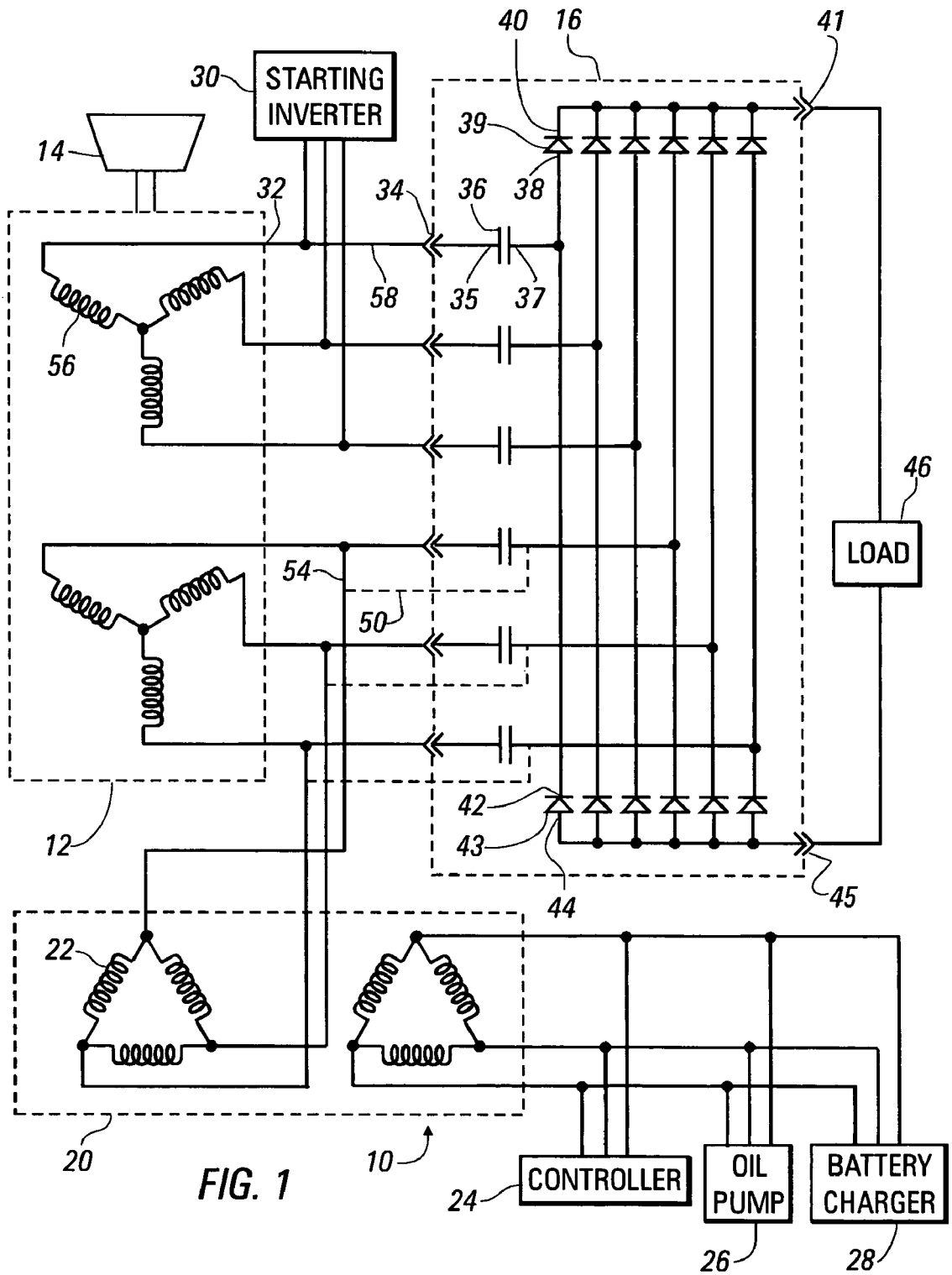
FIG. 1 is a schematic view of an electrical power generating system built in accordance with the present invention.

FIG. 1 is a schematic view of an electrical power generating system 10, built in accordance with the present invention to include a high-frequency six-phase alternator 12, driven by a microturbine 14, a rectifier module 16 converting high-frequency alternating current to direct current, and an auxiliary power supply 20 including a three-phase transformer with primary windings 22. The auxiliary power supply 20 provides power for auxiliary functions associated with operation of the microturbine 14, such as the operation of a controller 24, an oil pump 26 and a battery charger 28, which charges one or more batteries to provide power for a starting inverter 30, which is used to start the microturbine 14, with the alternator 12 operating as a motor having a three-phase alternating current input applied at three of its terminals 32.

In accordance with the invention, the rectifier module 16 includes an input terminal 34 connected to each of the output terminals 34 of the alternator 12, with each of the input terminals 34 being connected to one an input side 35 of a series capacitor 36. The output side 37 of the capacitor 36 is connected to a positive side 38 of a first diode 39, with the negative side 40 of the first diode being connected to the positive output terminal 41 of the rectifier module 16. Additionally, the negative side 42 of a second diode 43 is connected to the positive side 38 of the first diode 39 and to the output side 37 of the capacitor 36, with the positive side 44 of each of the second diodes 43 being connected to the negative output terminal 45 of the rectifier module 16. This arrangement provides for alternating current from each of the input terminals 34 to contribute to the flow of direct current between the positive and negative terminals 41, 45, through a load 46. For example, the load 46 includes means for generating 50- or 60-Hz alternating current from the direct current being supplied from the power boost rectifier unit 16. For example, each of the capacitors 36 is selected by the criteria described in U.S. Pat. App. Pub. No. 2003/0222459 A1 so that a drop of voltage from no-load to full-load occurring at the associated alternator terminal 32 is substantially offset at the output side 48 of the capacitor 36, with the RMS values of the voltages between the output sides 37 of the capacitors 36 remaining essentially at constant levels as the alternator 12 is operated at loaded and unloaded conditions.

The rectifier module 16 may include an optional housing holding the capacitors 36 as well as the rectifier components, forming a convenient modular device capable of converting alternating current to direct current and additionally capable of compensating for the drop in voltage between unloaded and loaded conditions within the alternator 12 to control voltage regulation within the power generating system 10.

The dashed lines 50 illustrate the conventional method of connecting the auxiliary power supply 20 to the output sides 37 of the capacitors 36, instead of by the method of the invention, in which the auxiliary power supply 20 is connected to three of the output terminals 32 of the alternator 12, as indicated by solid lines 54. FIGS. 2–8 are tables showing current levels measured during operation of three examples of a power generating station including a six phase alternator 12 operating under various conditions to produce up to 112 kW of power at a frequency of 2.3 kHz, with an auxiliary power supply 20 using 2 kW of power connected either in the conventional way, as indicated by dashed lines 50, or in the method of the invention, as indicate by solid lines 54. Each of the capacitors 36 is a 50 µF device, rated at 80 amp, 100 VAC, 50/60 Hz. For example, such capacitors are obtained as Series 860 capacitors through www-.camcap.uk.co. The rectifier diodes 39, 43 are devices rated at greater than 1200 VDC and greater than 80 amp RMS, being obtained, for example, in two-diode packages under part number SKKD15F14 from www.semikron.com. The alternator 12 is a six-phase device, with six windings 56 connected to phase lines 58, each of which is connected to an input terminal 34 of the rectifier module 16, and three of which are additionally connected to the primary windings 22 of the transformer within the auxiliary power supply 20.

FIGS. 2–4 are tables showing current levels measured for various levels of output power with this conventional method of connection, having the auxiliary power supply 20 connected to the output sides 37 of the capacitors in the phase 4, 5, and 6 lines. The data shown in FIGS. 2 and 3 were taken with a first and second example, respectively, of the power generating station operating in a voltage mode, in which the output voltage is allowed to vary to achieve various levels of power. This mode is generally used when the generating station is used in a stand-alone application, providing power for a number of devices not connected to another power system. In the data shown in FIG. 2, current levels in the phase 1, 3, and 4 were not measured. The data shown in FIG. 4 were taken with a third example of the power generating station operating in a current mode, in which the output voltage is fixed while the current is varied to achieve differences in the output power. This mode is used when the generating station is used to provide power to an operating electrical grid. The limitation of holding the voltage fixed reduces the levels through which the output power can be varied. In each case, the current levels measured within the phase lines to which the auxiliary power supply was connected were substantially higher than the current levels measured in the other three phase lines. These differences, which were much greater than the differences to be expected due to power usage within the auxiliary power supply, placed substantial limitations on the levels of power that could be generated by the station without unacceptable degradation of components within the affected phase lines.

FIG. 5 is a table of current values measured using the first example of a power generating station with the auxiliary power supply 20 wired in the conventional manner, as illustrated by dashed lines 50, but with the auxiliary power supply 20 being wired to the phase 1, 2, and 3 lines, instead of to the phase 4, 5, and 6 lines. The measurement of current levels similar to those shown in FIG. 2 indicates that the higher current values in the phase lines connected to the auxiliary power supply 20 were not a result of differences among the windings 56 of the alternator 12. Current values in phase 2, 4, and 6 lines were not measured.

FIG. 6 is a table of current values measured using the first example of a power generating station with the capacitance of the capacitors 36 removed from the system by shorting across each of these capacitors. The auxiliary power supply 20 was wired to the phase 1, 2, and 3 lines. The measurement of current levels in the phase lines connected to the auxiliary power supply 20 that were similar to the current levels in the phase lines not connected to the auxiliary power supply 20 indicated that the problem of higher current levels in the phase lines connected to the power supply 20 was associated with the capacitance of the capacitors 36. However, this is not a practical solution for the problems of the current, since the voltage regulation of the power generating system operating without this capacitance is poor, resulting in a substantial difference between operation at no load and at a rated load.

FIGS. 7 and 8 are tables showing current values measured using a power generating station having the auxiliary power supply 20 wired in accordance with the invention, as indicated by the solid lines 54 in FIG. 1. FIG. 7 shows values measured with the first example of a power generating station operating in voltage mode with the auxiliary power supply 20 wired to the phase 1, 2, and 3 lines. FIG. 8 shows values measured with the third example of a power generating station operating in current mode, with the auxiliary power supply 20 wired to the phase 4, 5, and 6 lines. The fact that the current values shown in FIGS. 7 and 8 for the lines to which the auxiliary power supply 20 was connected were almost the same as the current values for the lines to which the auxiliary power supply 20 was not connected indicates that the problem of higher current values in lines to which the auxiliary power supply 20 is connected is solved by the configuration of the invention.

It is believed that the connection of the auxiliary power supply 20 in the conventional manner, as indicated by dashed lines 50 produces voltage excursions at the alternating current frequency of 2.3 kHz, with resonance occurring between the capacitance of the capacitors 36 and the inductance of the windings 22 of the transformer within the auxiliary power supply 20, and with these voltage excursions causing a flow of current that limits the power at which the generating station can be operated. On the other hand, it is believed that the connection of the auxiliary power supply 20 according to the invention, as indicated by solid lines 54, merely adds the inductance of the windings 22 of the transformer to the larger inductance of the windings 56 of the alternator, resulting in a relatively small effect on the current flow.

While the invention has been described in its preferred embodiment with some degree of particularity, it is understood that this description has been given only by way of example, and that many variations can be made without departing from the spirit and scope of the invention, as defined in the appended claims.

What is claimed is:

1. A system for generating direct current and for generating auxiliary power for use within the system, wherein the system comprises:
    an alternator including a plurality of alternator output terminals;
    a plurality of capacitors, wherein each capacitor in the plurality of capacitors includes an input side connected to one of the alternator output terminals and an output side;
    a rectifier including a plurality of input points, wherein each of the input points is connected to the output side of one of the capacitors; and
    an auxiliary power supply connected to two or more of the alternator output terminals.

2. The system of claim 1, wherein the auxiliary power supply includes a transformer having primary windings connected to the two or more alternator output terminals.

3. The system of claim 2, wherein the alternator produces alternating current having a frequency exceeding one kHz.

4. The system of claim 3, wherein RMS values of voltages between the output sides of the capacitors remains essentially constant as the alternator is operated at loaded and unloaded conditions.

5. The system of claim 2, wherein
    the alternator includes six alternator output terminals providing alternating current at six phases, and
    three of the alternator output terminals are connected to the primary windings of the transformer to provide alternating current at three phases.

6. The system of claim 1, wherein the rectifier includes:
    a positive rectifier output terminal;
    a negative rectifier output terminal;
    a first plurality of diodes, wherein each diode in the first plurality of diodes has a negative side connected to the positive rectifier output terminal and a positive side; and
    a second plurality of diodes, wherein each diode in the second plurality of diodes has a positive side, connected to the negative rectifier output terminal, and a negative side, connected to the positive side of a diode in the first plurality of diodes and additionally to one of the input points of the rectifier.

7. The system of claim 6, additionally comprising a rectifier module including the plurality of capacitors, the rectifier, and a plurality of module input terminals, wherein each of the module input terminals is connected to the input side of one of the capacitors and to one of the alternator output terminals.

* * * * *